April 25, 1967     J. SHIFFMAN     3,315,363
MEASURING SCALE FOR WATCH CRYSTALS
Filed May 4, 1964
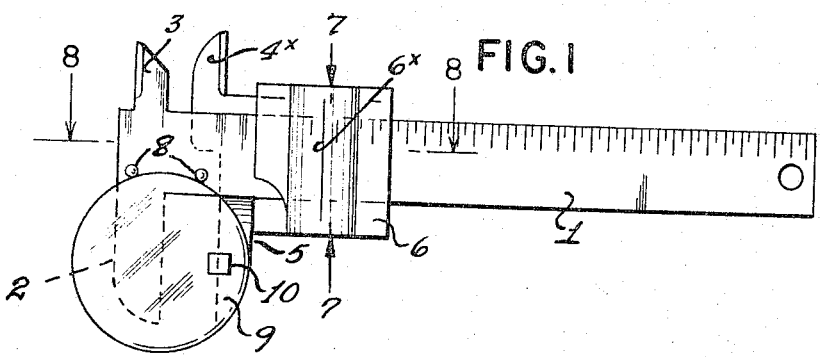
FIG. 1
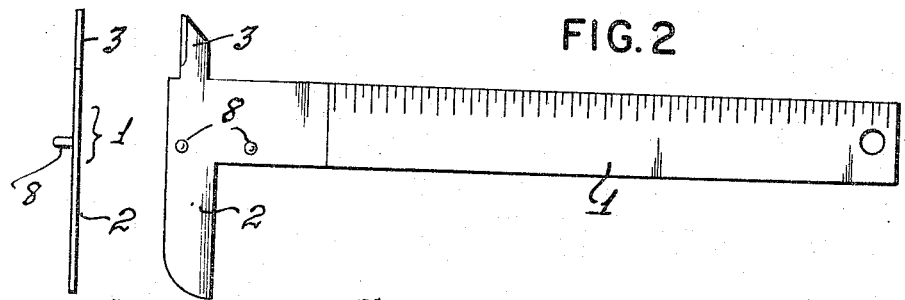
FIG. 3    FIG. 2
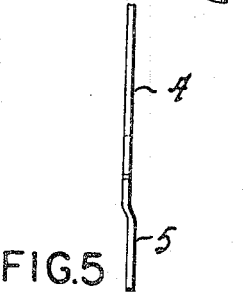 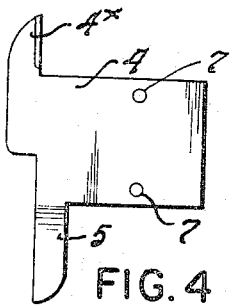 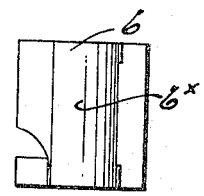 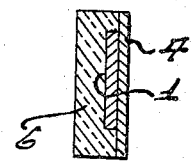
FIG. 5    FIG. 4    FIG. 6    FIG. 7
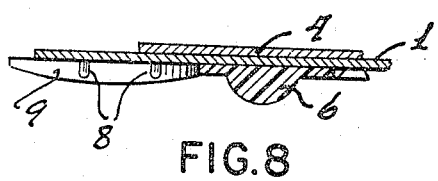
FIG. 8
INVENTOR.
Jerome Shiffman
by W Lee Helms
ATTORNEY.

United States Patent Office 3,315,363
Patented Apr. 25, 1967

3,315,363
MEASURING SCALE FOR WATCH CRYSTALS
Jerome Shiffman, 128 Carthage Road,
Scarsdale, N.Y. 10583
Filed May 4, 1964, Ser. No. 364,611
3 Claims. (Cl. 33—143)

Certain watches, principally calendar watches, are so constructed as to bring the days of the month, indicated by numerals, successively into view under the watch crystal. Because the numerals must be tiny, particularly with regard to watches for women, the crystal itself is provided with a small generally rectangular magnifying area, in order that the magnified numeral may be readily visualized. The positioning of the crystal must be exact so that its tiny magnifying area may be in register with the line of numerals, which are successively brought into position underneath the magnifying area. Because watches of such character vary greatly in diameter, and the marginal placement of the magnifying area, it is necessary, particularly in the replacement of crystals, to determine the exact position of the magnifying area of a given crystal to the axis of the crystal as to the center line of the magnifying area.

It is the object of the present invention to provide a measuring scale for such watch crystals which will automatically relate the axis of any watch crystal relatively to the scale, and by movement of the slide, until a line thereof is in register with the center of the magnifying area, visually determine the distance between the axis of the crystal and the center of the magnifying area thereof. This is done by viewing the scale through a magnifying member on the slide, the latter having a visual fine line for registration with the markings on the scale.

The invention will be described with reference to the accompanying drawings, in which:

FIG. 1 is a plan view of the embodiment of the invention showing a watch crystal in position thereon and the slide moved to delineate the center of the magnifying area of the crystal, so that the magnifier of the slide will show by its fine line the measurement on the scale;

FIG. 2 is a plan view of the scale;

FIG. 3 is a front end elevation of the scale;

FIG. 4 is a plan view of the slide per se;

FIG. 5 is a front elevation of FIG. 4;

FIG. 6 is a plan view of the magnifying element of the slide;

FIG. 7 is a transverse section through FIG. 1 on the line 7—7 of that figure; and FIG. 8 is a longitudinal section partially through FIG. 1 on the line 8—8 of that figure.

Referring to the drawings, I have shown at 1 a scale having at its upper margin the usual ruled measuring lines. The scale also is formed with a lens supporting leg at 2, above which is a nose 3.

In FIGURE 4 at 4 is shown the rear element of the slide. It has a lens supporting finger at 5 which is bent upwardly so as to have its upper surface in the same plane as that of the lens supporting finger 2 of the scale 1.

At 6 is shown the magnifying element of the slide, and it may be of optical glass as indicated in FIG. 7, or of clear plastic as indicated in FIG. 8. As shown at FIG. 7, the magnifying element of the slide is channeled to receive the scale 1, and the areas at the opposite margins of the channel serve as face abutments for the rear element 4 of the slide. The magnifying element 6 may be carried by the slide element 4 in any suitable manner, as, for example, by headed pins passed through apertures at 7 in member 4 and tightly pressed or threaded into apertures in member 6 at the margins thereof exterior to the channelway.

It will be seen that the scale 1 is provided with two spaced outwardly-projected pins 8, and at 9 I have shown a watch lens supported by the fingers 2 and 5 and so abutting the pins that the magnifying area at 10 on the crystal is positioned in a horizontal line parallel with the scale's lower edge. In FIG. 1 the slide has been moved until the rear edge of its finger 5 is in a transverse line crossing the center of the crystal magnifying area 10. The line 6ˣ on the magnifying element 6 of the slide will be in register with an appropriate marking on scale 1, and visually indicate the measurement of the distance between the axis of the watch crystal and the center of its magnifying area 10.

It will also be noted that in addition to nose 4ˣ on the slide, the scale is formed with a nose 3. By operating the slide with each nose abutting the margin of a watch bezel, the diameter thereof can be measured by the scale.

It will be understood that various modifications can be made in the form and arrangement of the embodiment shown in the drawings, without departing from the spirit of the invention.

Having described my invention, what I claim and desire to secure by Letters Patent is as follows:

1. A measuring scale for watch crystals of that type in which the crystal is provided with a small, generally rectangular magnifying area at one margin thereof, comprising an elongated scale member marked with measuring lines, a slide carried by and movable along said scale member and having a magnifying area through which the markings of the scale member may be visualized, said scale member carrying two spaced abutments at its front end area, said abutments being in a line running longitudinally of the scale member, and said scale member having a laterally projected support, said abutments being adapted to contact the periphery of a crystal lying upon said laterally projected support, the slide being spaced from said abutments and carrying a registration member having an index edge and extending in the same direction and in the same plane as the support and scale member and providing a support finger for coaction with the support for supporting a watch crystal thereon, said index edge adapted to be moved by the slide to the center line of the magnifying area carried by a watch crystal which at its periphery lies in contact at its top area with said abutments, said magnifying area of said slide being mounted on one end of the slide away from the index edge such that it will not interfere with a watch crystal placed on the support and the registration member.

2. A measuring scale for watch crystals constructed in accordance with claim 1, in which the spaced abutments are pins projecting from the scale member.

3. A measuring scale, for watch crystals, constructed in accordance with claim 1, in which the scale member and the slide each carries a nose directed reversely to the watch crystal support and registration members and adapted for abutting the bezel of a watch.

References Cited by the Examiner

UNITED STATES PATENTS

| 639,671 | 12/1889 | De Smith | 33—143 |
| 2,305,376 | 12/1942 | Blum | 33—143 |
| 2,405,720 | 8/1946 | Snedaker | 235—70.2 |
| 2,515,214 | 7/1950 | Goldberg | 33—143 X |

FOREIGN PATENTS

| 422,099 | 1/1911 | France. |
| 154,266 | 9/1904 | Germany. |
| 286,154 | 3/1928 | Great Britain. |
| 560,477 | 4/1944 | Great Britain. |

LEONARD FORMAN, *Primary Examiner.*

H. N. HAROIAN, *Assistant Examiner.*